United States Patent
Acker et al.

(10) Patent No.: US 6,821,658 B2
(45) Date of Patent: Nov. 23, 2004

(54) COLD START AND TEMPERATURE CONTROL METHOD AND APPARATUS FOR FUEL CELL SYSTEM

(75) Inventors: William P. Acker, Rexford, NY (US); Shimshon Gottesfeld, Niskayuna, NY (US); William W. Dailey, Loudonville, NY (US)

(73) Assignee: MTI MicroFuel Cells Inc., Albany, NY (US)

( * ) Notice: Subject to any disclaimer, the term of this patent is extended or adjusted under 35 U.S.C. 154(b) by 147 days.

(21) Appl. No.: 09/798,314

(22) Filed: Mar. 2, 2001

(65) Prior Publication Data

US 2002/0122966 A1 Sep. 5, 2002

(51) Int. Cl.[7] .......................... H01M 8/00; H01M 8/04; H01M 8/12; H01M 2/00; H01M 2/02
(52) U.S. Cl. .............................. 429/13; 429/23; 429/24; 429/34
(58) Field of Search ............... 429/13, 19, 20, 429/22, 24, 34, 23

(56) References Cited

U.S. PATENT DOCUMENTS

| | | | |
|---|---|---|---|
| 4,673,624 A | 6/1987 | Hockaday | 429/41 |
| 4,810,597 A | 3/1989 | Kumagai et al. | 429/22 |
| 4,828,941 A | 5/1989 | Sterzel | |
| 5,523,177 A | 6/1996 | Kosek et al. | 429/40 |
| 5,573,866 A | 11/1996 | Van dine et al. | 429/13 |
| 5,599,638 A | 2/1997 | Surampudi et al. | 429/33 |
| 5,631,099 A | 5/1997 | Hockaday | 429/30 |
| 5,672,438 A * | 9/1997 | Banerjee et al. | 429/33 |
| 5,723,228 A | 3/1998 | Okamoto | 429/12 |
| 5,759,712 A | 6/1998 | Hockaday | 429/30 |
| 5,766,786 A | 6/1998 | Fleck et al. | 429/17 |
| 5,773,162 A | 6/1998 | Surampudi et al. | 429/39 |
| 5,795,668 A | 8/1998 | Banerjee | 429/33 |
| 5,916,699 A | 6/1999 | Thomas et al. | 429/3 |
| 5,945,231 A | 8/1999 | Narayanan et al. | 429/30 |
| 5,992,008 A | 11/1999 | Kindler | 29/730 |
| 6,068,941 A | 5/2000 | Fuller et al. | 429/13 |
| 6,103,410 A | 8/2000 | Fuller et al. | 429/13 |

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Sources for Portable Electronic Devices", Shimson Gottesfeld and Mahlon S. Wilson, pp. 487–517.

* cited by examiner

Primary Examiner—Stephen Kalafut
Assistant Examiner—Julian Mercado
(74) Attorney, Agent, or Firm—Cesari and McKenna, LLP

(57) ABSTRACT

A fuel cell which provides improved performance during a cold start. Several embodiments are provided to enable the controlled introduction of fuel into the cathode of the fuel cell such that oxidation occurs, heat is released and the temperature of the fuel cell is raised. Such fuel may be introduced into the cathode directly or may be introduced into the anode and allowed to crossover an electrolytic membrane. Alternatively, the fuel may be directed through a special conduit which allows oxidation of some of the fuel as it flows through.

19 Claims, 10 Drawing Sheets

COLD START AND TEMPERATURE CONTROL METHOD AND APPARATUS FOR FUEL CELL SYSTEM

BACKGROUND OF THE INVENTION

1. Field of the Invention

The present invention relates generally to the field of fuel cells and, more specifically, to a fuel cell system in which the temperature within the cell may be raised and controlled to improve performance in cold environments.

2. Background Information

Fuel cells are devices in which an electrochemical reaction is used to generate electricity. A variety of materials may be suitable for use as a fuel, depending upon the materials chosen for the components of the cell. Organic materials, such as methanol or formaldehyde, are attractive choices for fuels due to their high specific energies.

Fuel cell systems may be divided into "reformer based" (i.e., those in which the fuel is processed in some fashion before it is introduced into the cell) or "direct oxidation" in which the fuel is fed directly into the cell without internal processing. Most currently available fuel cells are of the reformer-based type, and their fuel processing requirement limits their application to relatively large applications relative to direct oxidation systems.

An example of a direct oxidation system is the direct methanol fuel cell system or DMFC. In a DMFC, the electrochemical reaction at the anode is a conversion of methanol and water to $CO_2$, $H^+$ and $e^-$. More specifically, a carbonaceous fuel (typically methanol in an aqueous solution) is applied to a protonically-conductive, electronically non-conductive membrane in the presence of a catalyst to enable direct anodic oxidation of the carbonaceous fuel at the anode. Upon contact with the catalyst, hydrogen atoms from the fuel are separated from the other components of the fuel molecule. Upon closing of a circuit connecting the anode to the cathode through an external load the protons and electrons from the hydrogen are separated, the resulting protons pass through the membrane electrolyte, and the electrons travel through an external load. The protons and electrons combine on the cathode, with oxygen supplied to the cathode, generating water at the cathode. The carbon component of the fuel is converted into $CO_2$ at the anode, thus generating additional protons and electrons.

Present membrane electrolytes are permeable to methanol and water. Consequently, methanol may pass through the membrane electrolyte to the cathode side without generating electricity. This phenomenon, commonly referred to as "methanol crossover," reduces the efficiency of the DFMC, and generates heat as a result of the oxidation of the "crossed-over" methanol at the cathode side of the cell. Presently, methanol crossover is reduced by diluting the methanol with water, and using a methanol solution of approximately 3% methanol as fuel for a DMFC.

During optimal steady state operation, DMFCs operate at temperatures that are generally higher than ambient air temperatures, with most operating between 30° and 80° C., depending on the application for which the DMFC is providing power. The performance of the DMFC (and therefore the DMFC power system) is related to the temperature of the DMFC. Thus, when a DMFC has been inactive for an extended period of time or is required to operate in a cold ambient environment, the DMFC will typically not perform optimally until the cell is warmed up by heat that is generated during operation. This is particularly problematic in applications such as consumer electronic devices because such devices may be used in cold environments or are "off" for substantial time periods, during which time the DMFC may cool below an optimal operating temperature. It is therefore desirable to develop a system that allows a DMFC to ramp up to full operating temperature quickly to allow for generation of desired electricity as quickly as possible.

SUMMARY OF THE INVENTION

The present invention provides an apparatus and method for increasing the temperature of a fuel cell, such as a DMFC, and maintaining it at an optimal level by directing fuel to the cathode in order to cause heat-producing oxidation. By increasing the temperature in the fuel cell, "cold start" performance of the fuel cell is improved. In a preferred embodiment, fuel is supplied directly to the cathode side of the fuel cell through a bypass fuel assembly, rapidly generating heat within the cell. The bypass fuel assembly includes a temperature sensor, a controller and a bypass valve. The sensor detects the temperature within the cell and sends a signal indicative of the temperature to the controller. In response to the signal from the temperature sensor, the controller determines whether to direct fuel to the cathode via the bypass valve in order to raise the cell's temperature. Alternatively, electrical or other characteristics of the fuel cell can be used to direct flow of methanol to the cathode, and eliminate the need for a temperature sensor in the fuel cell.

In accordance with a first alternative embodiment of the invention, additional fuel beyond that needed to operate the fuel cell is applied to the anode. The increased concentration of fuel in the anode accelerates crossover of fuel through the membrane electrolyte, thereby increasing the amount of fuel present in the cathode and, in turn, the amount of heat generated by oxidation.

In accordance with a second alternative embodiment of the invention, a conduit is provided between a fuel source and the anode or cathode of the DMFC. The sidewall of the conduit includes an assembly which may admit air from outside the conduit and a catalyst over which the fuel passes. As the fuel flows through the conduit, the catalyst causes oxidation of some of the fuel, thus generating heat which is carried into the anode or cathode or both to raise the temperature of the DMFC and the DMFC power system. By expanding the conduit into a series of branches, at least some of which include the catalytic assembly, and arranging a number of valves among the branches, the amount of heat generated may be more precisely controlled. Alternatively, a single branching conduit can be equipped with a metering valve that controls the flow through the conduit and thereby regulates the temperature of the DMFC.

In accordance with another aspect of the invention, the flow of fuel which is being used to raise the temperature of the DMFC is controlled with a control valve that is either electrically or thermally actuated. In the thermally actuated version, a valve may be constructed of two materials having different coefficients of expansion. When the temperature is relatively cold, the valve is open and allows fuel to flow to the DMFC, which eventually raises the temperature. As the temperature rises sufficiently high, the valve closes and cuts off the flow of fuel. As a result, the DMFC's temperature is well regulated without the need for a temperature sensor, controller or bypass valve.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
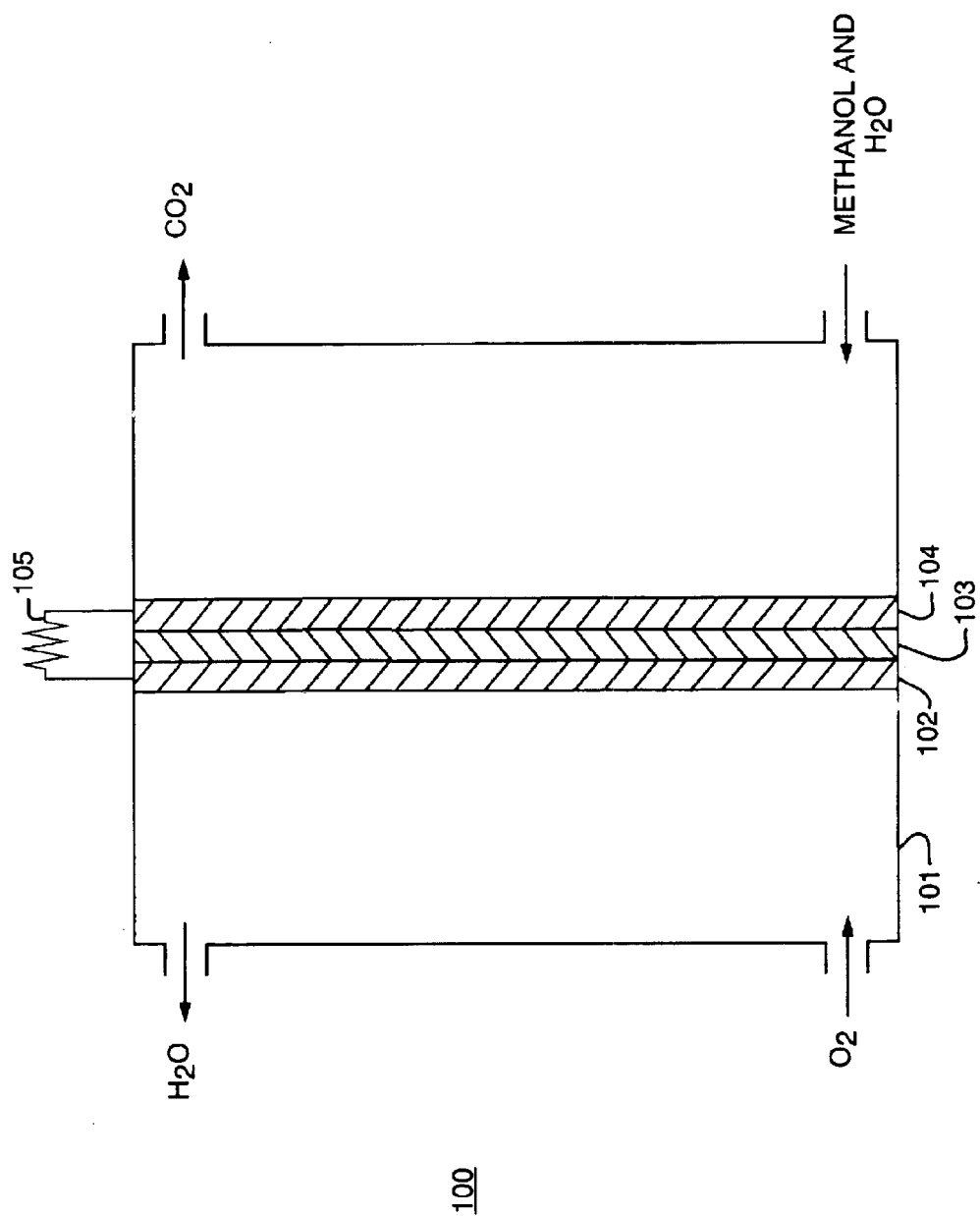
FIG. 1 is a block diagram of a direct methanol fuel cell known in the prior art.

FIG. 1 shows a schematic diagram of a direct methanol fuel cell (DMFC) 100 known in the prior art in which a housing 101 encloses a cathode 102, a membrane electrolyte 103, and an anode 104. A load 105 is connected across cathode 102 and anode 104. Methanol or a methanol/water solution are introduced into the anode 104 side of housing 101 while oxygen is introduced into the cathode 102 side of the housing 101. The source of the oxygen is preferably ambient air, but other sources could be used. As a result of the reactions at the anode 104 and cathode 102, electrons flow through wires from anode 104 through load 105 to cathode 102, while hydrogen ions flow from anode 104 through membrane 103 to cathode 102. So long as the reactions continue and the circuit is closed, a current is maintained through load 105.

DMFC 100 may be constructed from a variety of commercially available materials using proton conducting membranes (such as Nafion®, available from E.I. DuPont de Nemours and Company) and catalysts such as a Platinum/Ruthenium mixture (available from Johnson Matthey, PLC and other specialty companies) or acid-filled porous separators. The remaining components of DMFC 100 can be constructed using existing fabrication techniques and readily available materials.

Figure 2:
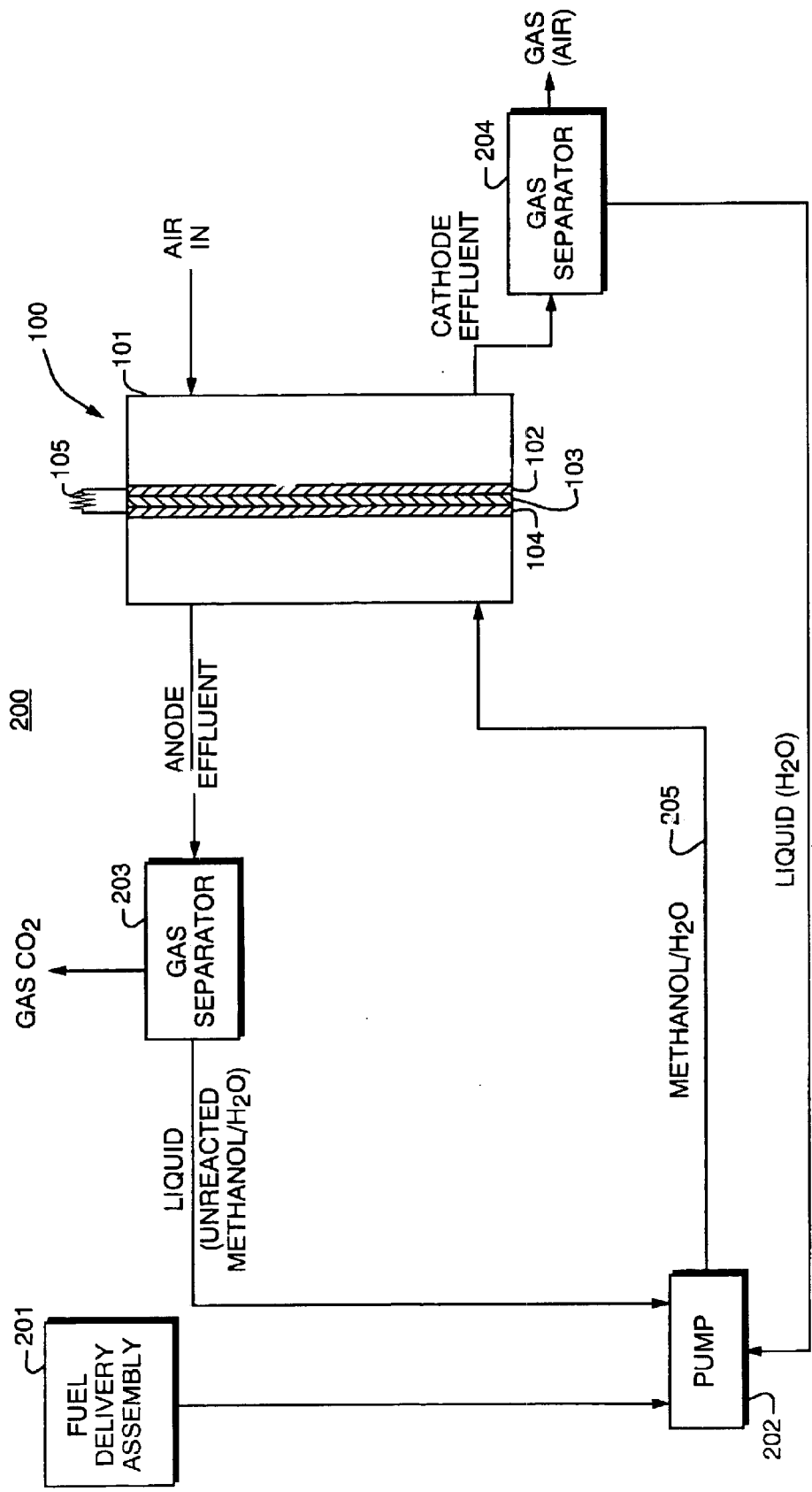
FIG. 2 is a block diagram of a direct methanol fuel cell power system known in the prior art.

Referring to FIG. 2, a direct methanol fuel cell (DMFC) power system 200 with which the temperature control system of the present invention may be used, is illustrated. Fuel from a fuel delivery assembly 201 is supplied directly to a pump 202 or, alternatively, may be supplied to a reservoir (not shown) positioned upstream from the pump. Pump 202 is supplied with or draws liquid from anode effluent, through a gas separator 203, and from cathode effluent through a second gas separator 204, pumping the fuel solution to anode of DMFC 100 via conduit 205. Gas separators 203 and 204 may be based on a CO2 permeable/water impermeable membrane, or a variety of other techniques known in the art. The present invention is not dependent upon the presence of gas separators and may be used with fuel cell systems which do not include such separators.

Figure 3:
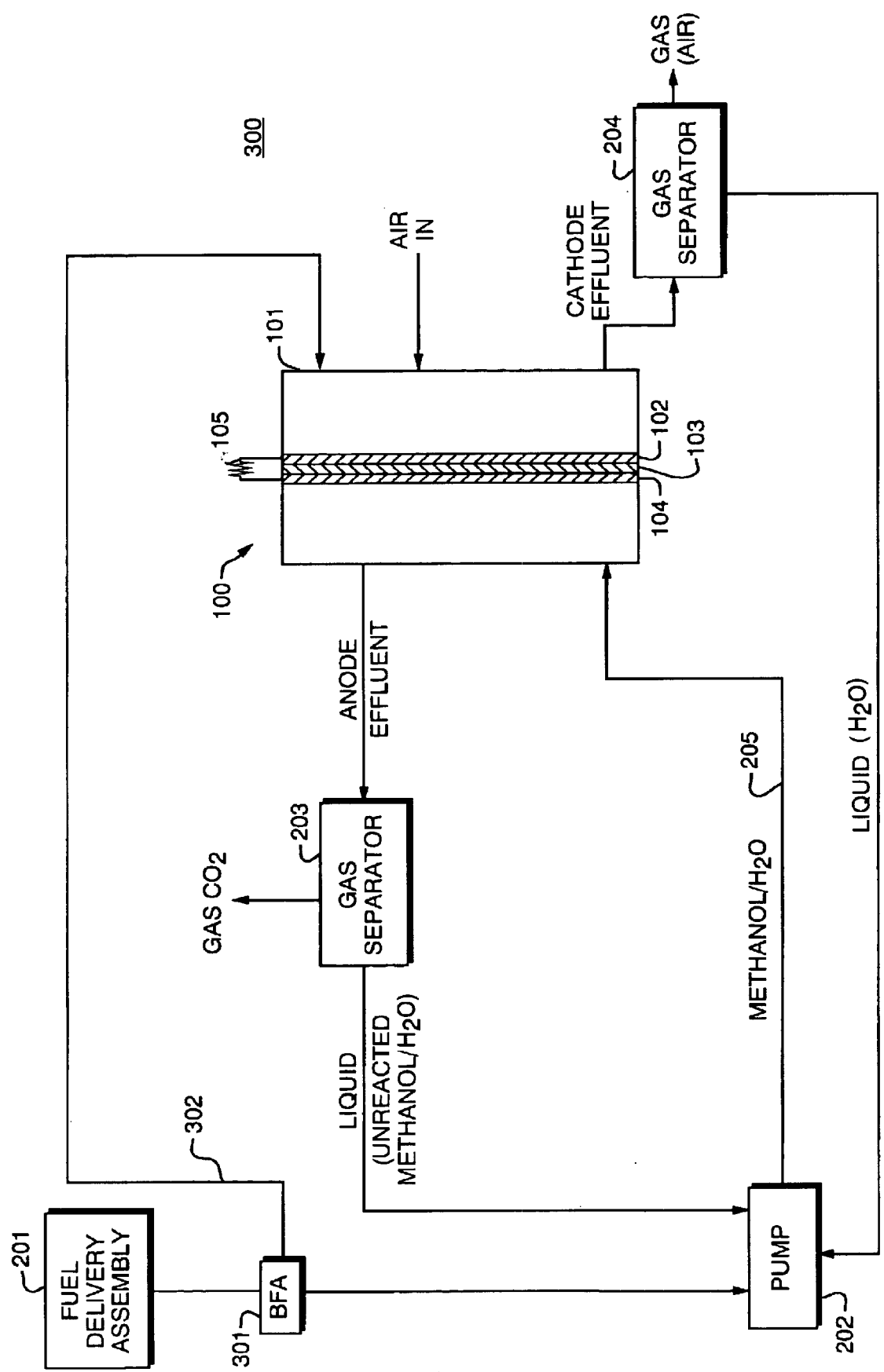
FIG. 3 is a block diagram of a direct methanol fuel cell power system constructed in accordance with a preferred embodiment of the present invention.

Gas separator 203 receives effluent from anode 104 and separates it into liquid (i.e., unreacted methanol or methanol and water) and carbon dioxide gas which is vented to the external environment. The liquid component is returned to pump 202 for recirculation to DMFC 100. The gas component may, alternatively, be returned to pump 202 and used to drive the pump in accordance with the teachings of commonly-owned U.S. patent application Ser. No. 09/717,754. Pump 202 may be designed so as to control the proportions of flow of each of the water, neat methanol, and fuel solution input streams. Referring to FIG. 3, DMFC power system 200 of FIG. 2 is illustrated with the addition of a bypass fuel assembly (BFA) 301. Bypass fuel assembly 301 operates to supply fuel to the cathode 102 of DMFC 100 through a conduit 302. Such fuel reacts with oxygen (from ambient air or other source) normally present in cathode 102, oxidizes and generates heat which raises the temperature of DMFC 100. It is preferred that bypass fuel assembly 301 supply "neat" fuel that has not been circulated through the system as neat fuel is more highly concentrated and thus generates heat at a faster rate upon oxidation. If desired, a fuel source other than fuel delivery assembly 201 (not shown) may be used to provide fuel to BFA 301. It should be understood that the fuel delivery system may include an internal fuel tank, an external fuel cartridge or a combination of internal and external sources.

Figure 4:
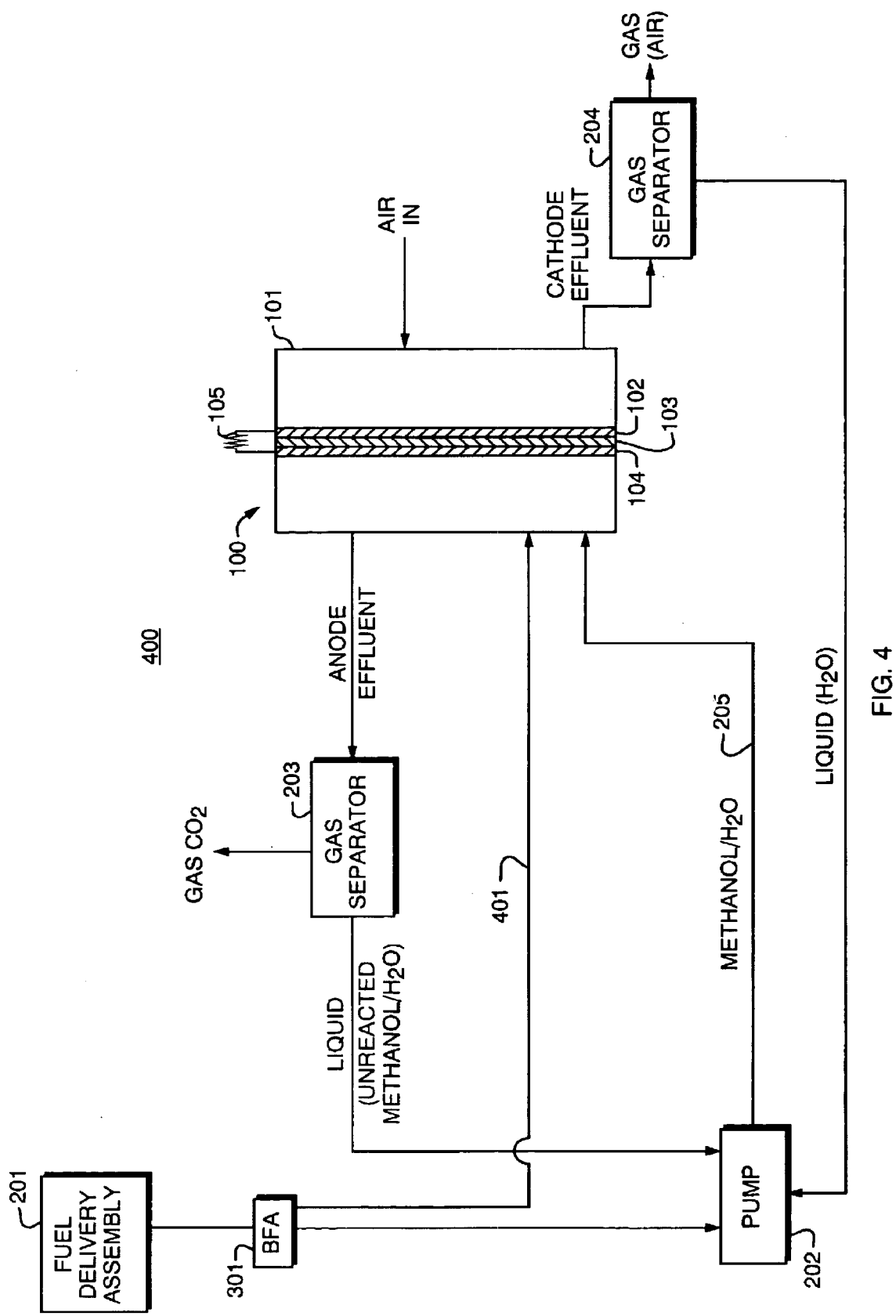
FIG. 4 is a block diagram of a direct methanol fuel cell power system constructed in accordance with a first alternative embodiment of the present invention.

FIG. 4 shows an alternative embodiment of the present invention in which DMFC power system 300 of FIG. 3 is modified by the omission of conduit 302 and the addition of conduit 401. In this embodiment, conduit 401 supplies fuel from BFA 301 to anode 104 of DMFC 100. Fuel supplied via conduit 401 effectively increases the concentration of fuel at anode 104, thereby increasing methanol crossover through membrane 103. Alternatively, BFA 301 may be used to increase the flow of fuel pump 202, thereby increasing the concentration of fuel in conduit 205 and, in turn, the concentration of fuel at anode 104. The higher fuel concentration results in increased methanol crossover, causing additional methanol to oxidize at cathode 102, thus increasing the temperature of the DMFC 100 and the DMFC power system 200. Such crossover results in increased methanol in the cathode 102 side of DMFC 100 that oxidizes and produces heat. System 400 increases the temperature in DMFC 100 at a slower rate than system 300. It will be understood by those skilled in the art that it may be advantageous to construct a system that combines systems 300 and 400. Such a combined system, if used appropriately, would provide both fast heating, as required to raise the temperature of a DMFC to optimal operating temperatures quickly, as well as effective control of the temperature of the DMFC during continuous operation.

Figure 5:
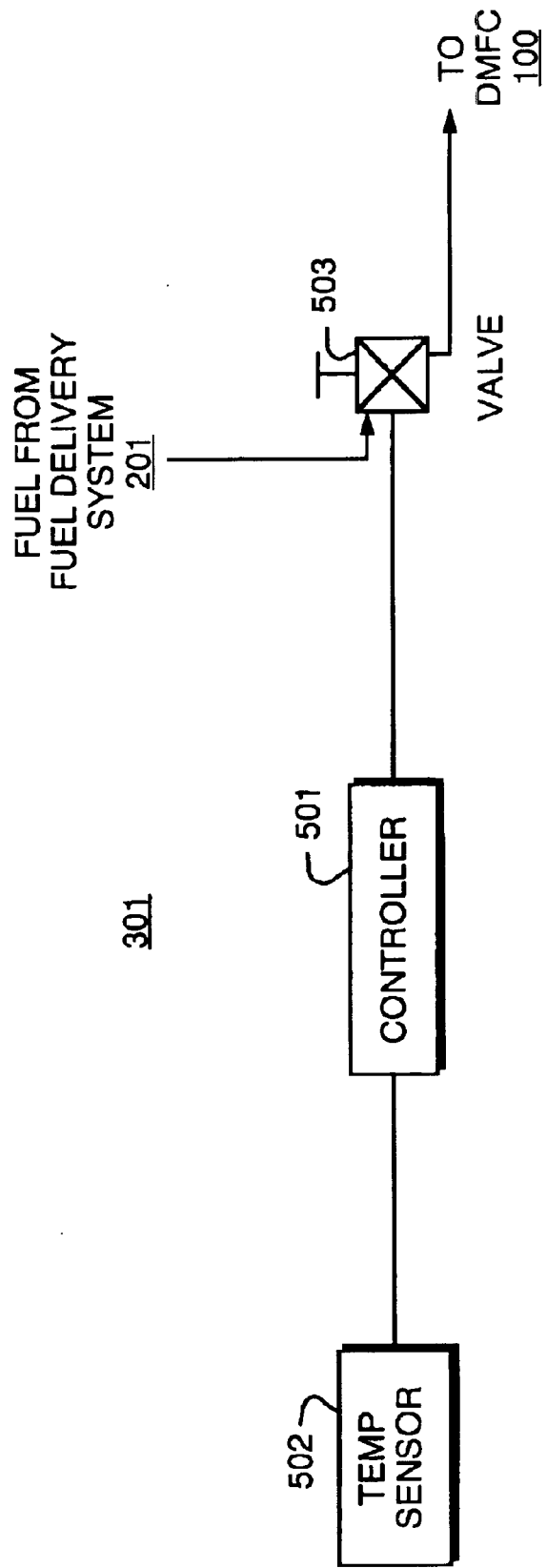
FIG. 5 is a block diagram of the bypass fuel assembly of FIGS. 3 and 4.

Referring to FIG. 5, a preferred embodiment of bypass fuel assembly 301 is shown in block diagram form. A controller 501 is coupled to a temperature sensor 502 and a valve 503. Temperature sensor 502 senses the temperature in DMFC 100 or DMFC power system 200 and sends a signal indicative of same to controller 501. Based on the sensed temperature, controller 501 opens or closes valve 503 to direct more or less methanol to DMFC 100, thus raising or lowering the temperature as appropriate.

Temperature sensor 502 may be implemented using any of a variety of commercially available direct temperature measurement devices, such as a thermocouple. Alternatively, an indirect method of temperature measurement may be used, including, but not limited to measuring the voltage or current produced by DMFC 100. This is possible because it is known that the operating temperature of DMFC 100 is closely related to its power output. Thus, by measuring the voltage at a given current or current at a given voltage produced by DMFC 100, the temperature may be calculated or obtained by reference to a lookup table based on the power/temperature relationship. Other relationships exist that may be used to indirectly measure the temperature of the DMFC, including, for example only, the generation of carbon dioxide and water over given periods of time.

Figure 6:
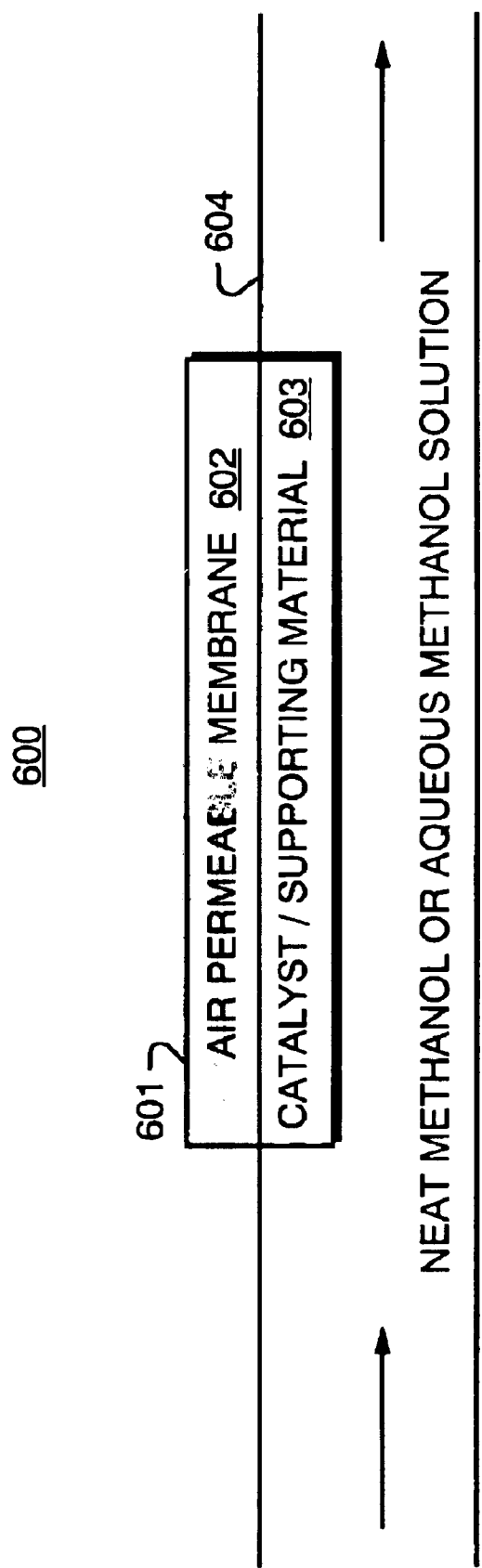
FIG. 6 is a block diagram of a conduit used in a second alternative embodiment of the present invention.

FIG. 6 shows an alternative embodiment of the present invention in which a conduit assembly 600 is used to generate heat to raise the temperature of DMFC power system 200 or 300. The structure of conduit assembly 600 may be used to implement conduit 205 (FIG. 2), conduit 302 (FIG. 3), other conduits within or attached to a DMFC, a separate conduit which is exclusively dedicated to the function of heat generation, or a combination of the foregoing. An oxidation pack 601 is integrated into a conduit wall 604. It should be understood that more than one oxidation pack could be integrated within conduit wall 604. Oxidation pack 601 includes an air permeable membrane 602 and a catalyst/supporting material 603. Catalyst/supporting material 603 is exposed to the interior of conduit assembly 600 such that when neat methanol or aqueous methanol solution passes over it heat-producing oxidation takes place. Air to support the oxidation is made available by a membrane 601 that is gas permeable but impermeable to neat methanol, water, or aqueous methanol solution.

Figure 7A:
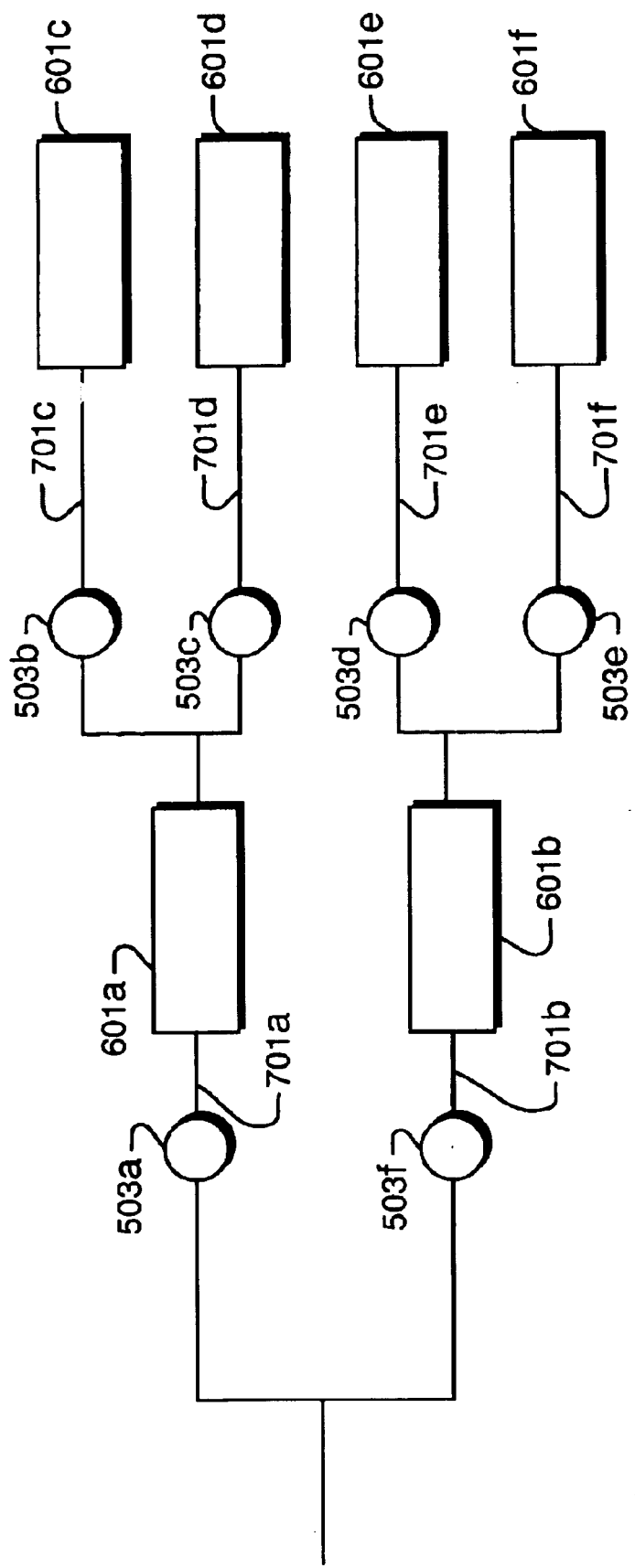
FIG. 7A is a block diagram of a conduit branching arrangement for use in the embodiment of FIG. 6 in the present invention.

In order to control the amount of heat generated by conduit assembly 600, some arrangement for controlling the flow of methanol through the conduit is needed. FIG. 7A shows one such arrangement in block diagram form. A series of oxidation packs 601a–601f are disposed on a series of conduit branches 701a–701f. Valves 503a–501f provide the ability to shut off particular branches 701 if less heat is needed. For example, if controller 501 (FIG. 5) receives a higher temperature reading from sensor 502 (i.e., less heat to is needed), then controller 501 may close valve 503b and cut off oxidation pack 601c Similarly, closing valve 503a effectively cuts off oxidation packs 601a, 601c and 601d as a group. In this fashion, the amount of heat generated may be rapidly or slowly increased or decreased as appropriate. Alternatively, the flow of air over oxidation packs 601, rather than the flow of methanol within the conduit, could be regulated to control the rate of oxidation. Such air regulation could be accomplished through incorporating a series of valves, seals or other devices or assemblies known to those skilled in the art.

Figure 7B:
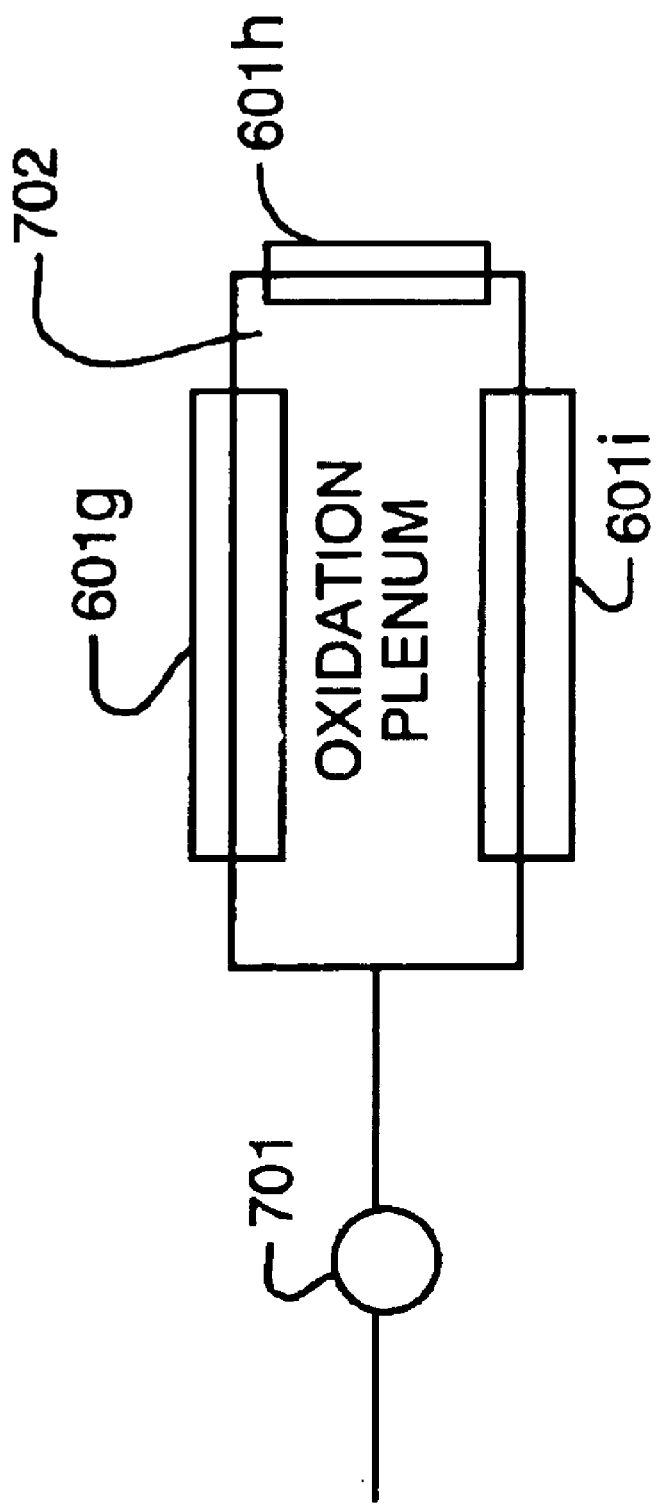
FIG. 7B is a block diagram of a closed end conduit which incorporates the oxidation pack of FIG. 6.

FIG. 7B shows a closed end conduit 700 which uses three oxidation packs 601g–601i to form an oxidation plenum 702. A valve 701 controls the flow of fuel into plenum 702. Closed end conduit 700 may be substituted for conduit assemblies 600c–600f in FIG. 7A.

Figure 8A:
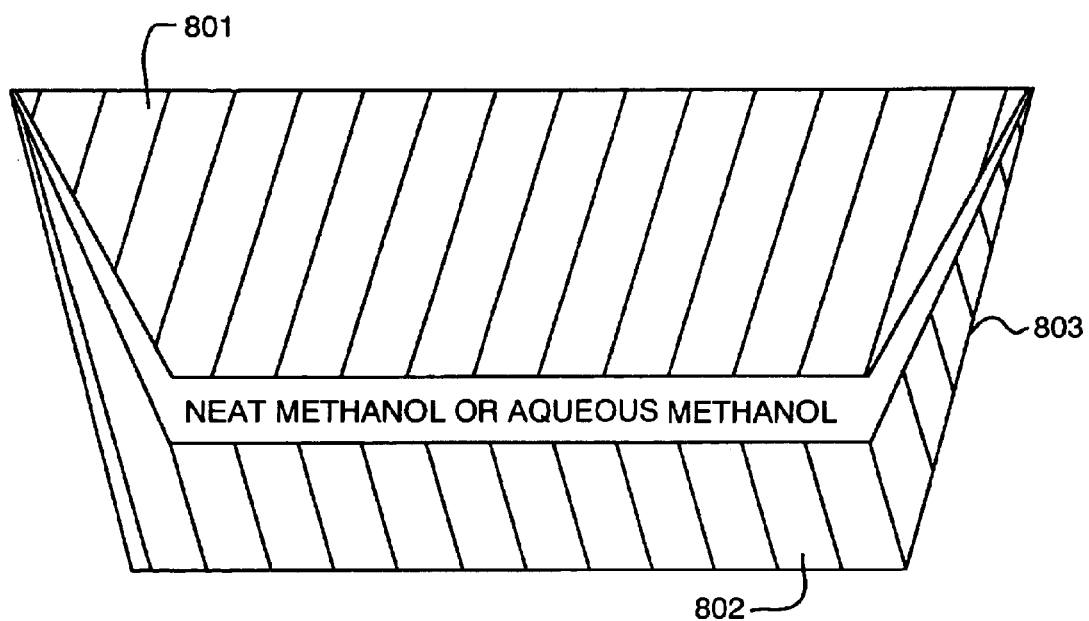
FIGS. 8A and 8B are cross-sectional schematic views of a valve or conduit of a third alternative embodiment of the present invention.
Figure 8B:
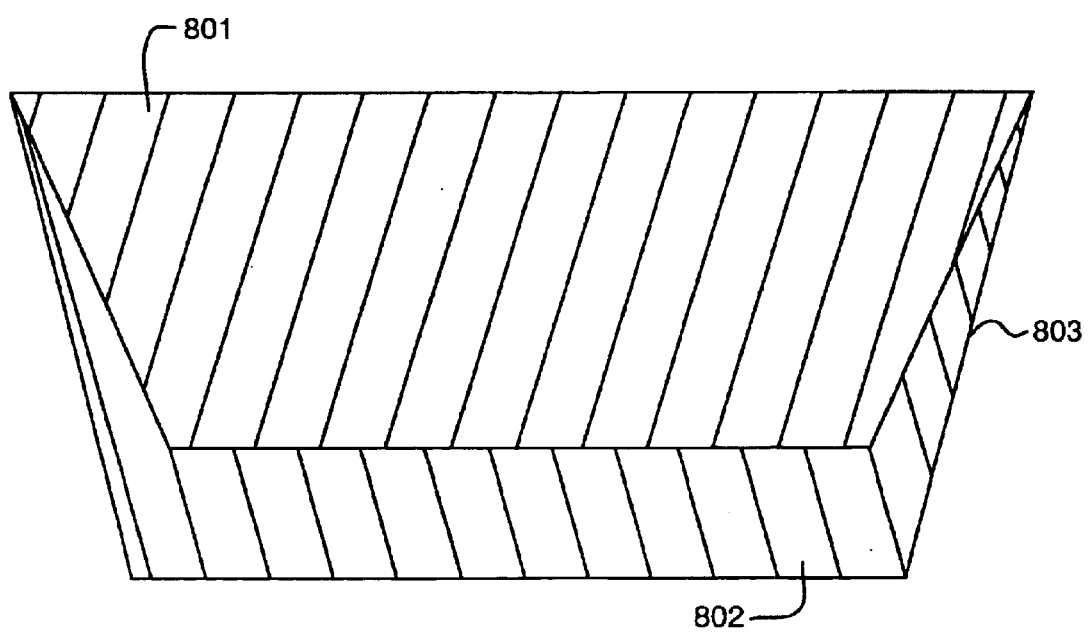

Referring to FIGS. 8A and 8B, an alternative embodiment of the present invention is shown. A valve 803 is constructed of two different materials. A base material 802 preferably has a low thermal expansion coefficient such that temperature changes have little or no effect on its shape or volume. Some examples of such material are silicon or chemically inert plastics. An expansion material 801 preferably has a relatively high thermal expansion coefficient such that an increase in temperature causes an increase in volume of the expansion material 801. Some examples of such material include chemically inert but thermally responsive plastics.

FIG. 8A shows valve 803 when the temperature is sufficiently low that the valve is open. That is, the volume of expansion material 801 is small enough that neat methanol or aqueous methanol solution can pass through a space between materials 801 and 802. When the temperature rises sufficiently, as illustrated in FIG. 8B, material 801 expands and closes the space, thus limiting the volume of fuel solution flowing through valve 803 to DMFC power system 200 or 300. By selecting materials 801 and 802 with appropriate thermal expansion coefficients, valve 803 may regulate the flow of fuel, and thus functionally replace controller 501, temperature sensor 502 and valve 503.

Figure 9:
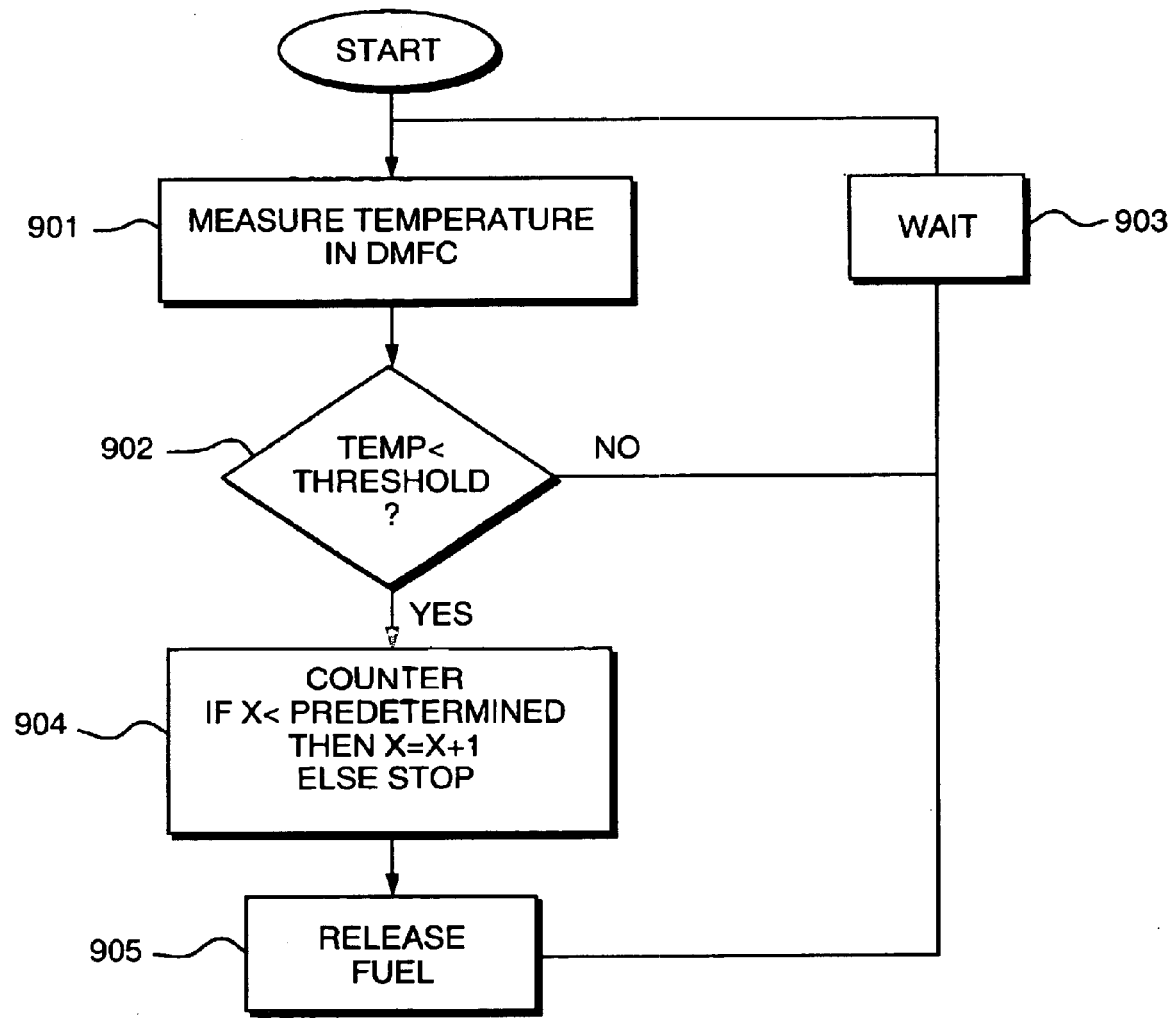
FIG. 9 is a flow chart of a method for controlling temperature in a direct methanol fuel cell.

Referring now to FIGS. 5 and 9, a method of controlling DMFC temperature, which method is preferably implemented through appropriate programming of controller 501, is described. At step 901, controller 501 receives a signal indicative of the current temperature in the DMFC. As described above, temperature in the DMFC may be measure directly or indirectly in a variety of ways. At step 902, controller 501 determines whether the current temperature is within an optimal temperature range, above the range or below the range. If the temperature is within the optimal range or above the range, controller 501 does not release any methanol through valve 503. Instead, controller 501 waits at step 903 for a predetermined period of time before the DMFC's temperature is measured again.

If the current temperature in the DMFC is below the optimal range, controller 501, at step 904, references a counter or previously stored value to determine how much methanol has been previously released for increasing the temperature in the DMFC. The aggregate amount of methanol that can be released for this purpose is preferably limited such that methanol concentration within the DMFC remains within an optimal range. Thus, additional methanol will be released at step 905 provided that the aggregate limit has not been reached. It should be understood that additional control steps may be added to control the release of methanol.

It should be understood that at least some of the foregoing embodiments of the present invention may be used with direct oxidation fuel cells other than DMFCs.

What is claimed is:

1. A direct oxidation fuel cell system, said system comprising:
an anode, a cathode, and a membrane electrolyte disposed between the anode and cathode;
a source of air or oxygen coupled to the cathode;
a source of carbonaceous fuel; and
a temperature regulation system, coupled to said source of fuel and said anode, responsive to a temperature of said system such that where said temperature is below a predetermined temperature or temperature range, said system increases fuel concentration at said anode to promote fuel cross-over through said membrane, thereby causing or increasing oxidation of some of said cross-over fuel at said cathode and increasing the temperature of said system.

2. The direct oxidation fuel cell system as in claim 1 wherein said temperature regulation system comprises a temperature sensor for generating a signal indicative of the temperature of said system.

3. The direct oxidation fuel cell system as in claim 2 wherein said temperature regulation system further comprises a controller coupled to said sensor and responsive to said signal for determining whether additional fuel should be provided to said anode to increase the temperature of said system.

4. The direct oxidation fuel cell system as in claim 3 wherein said temperature regulation system further comprises a valve, coupled to and responsive to said controller, for varying the amount of fuel provided from said source to said anode.

5. The direct oxidation fuel cell system as in claim 1 wherein said temperature regulation system controls fuel concentration in response to an electrical parameter of said fuel cell system which has a predetermined relationship to the fuel cell system's temperature and a signal, generated by a controller, that the fuel cell system's temperature is below said predetermined temperature or temperature range.

6. A direct oxidation fuel cell system, said system comprising:
   an anode, a cathode, and a membrane electrolyte disposed between the anode and cathode;
   a source of air or oxygen coupled to the cathode;
   a source of carbonaceous fuel; and
   a temperature regulation system, coupled to said source of fuel and said cathode, responsive to a temperature of said system such that when said temperature is below a predetermined temperature or temperature range, said system applies fuel directly into said cathode, thereby causing oxidation of fuel at said cathode and increasing the temperature of said system.

7. The direct oxidation fuel cell system as in claim 6 wherein said temperature regulation system comprises a temperature sensor for generating a signal indicative of the temperature of said system.

8. The direct oxidation fuel cell system as in claim 7 wherein said temperature regulation system further comprises a controller coupled to said sensor and responsive to said signal for determining whether additional fuel should be provided to said anode to increase the temperature of said system.

9. The direct oxidation fuel cell system as in claim 8 wherein said temperature regulation system further comprises a valve, coupled to and responsive to said controller, for varying the amount of fuel provided from said source to said anode.

10. The direct oxidation fuel cell system as in claim 6 wherein said temperature regulation system controls fuel concentration in response to an electrical parameter of said fuel cell system which has a predetermined relationship to the fuel cell system's temperature and a signal, generated by a controller, that the fuel cell system's temperature is below said predetermined temperature or temperature range.

11. The direct oxidation fuel cell system as in claim 10 wherein said temperature regulation system controls fuel delivery in response to a current or voltage produced by said fuel cell system and a signal indicating that the fuel cell system's temperature is below a predetermined temperature range.

12. A method of controlling temperature in a direct oxidation fuel cell system, said method comprising the steps of:
   (1) providing a fuel source for delivering a carbonaceous fuel suitable for generating electricity in an electrochemical reaction to a fuel cell in said fuel cell system;
   (2) sensing a temperature in said system;
   (3) determining whether the sensed temperature is below a predetermined temperature or temperature range;
   (4) when said sensed temperature is not below the predetermined temperature or range, repeating steps (2) and (3);
   (5) when said sensed temperature is below the predetermined temperature or range, determining how much carbonaceous fuel from said fuel source has previously been delivered to said system;
   (6) when the amount of carbonaceous fuel from said fuel source previously delivered to said system is less than a predetermined maximum limit, providing or releasing said carbonaceous fuel suitable for generating electricity in an electrochemical reaction from said fuel source to the fuel cell in such a manner as to cause or increase oxidation of such fuel, thereby generating heat and raising the temperature of the system.

13. The method of controlling temperature in a direct oxidation fuel cell system as defined in claim 12, wherein said carbonaceous fuel suitable for generating electricity in an electrochemical reaction in a fuel cell in said fuel cell system is delivered from said fuel source to a cathode aspect of a membrane electrode assembly in said fuel cell in said fuel cell system.

14. The method of controlling temperature in a direct oxidation fuel cell system as defined in claim 12, wherein said carbonaceous fuel suitable for generating electricity in an electrochemical reaction in a fuel cell in said fuel cell system is delivered from said fuel source to an anode aspect of a membrane electrode assembly in said fuel cell in said fuel cell system.

15. A method of controlling temperature in a direct methanol fuel cell system, said method comprising the steps of:
   (1) sensing a temperature in said system;
   (2) determining whether the sensed temperature is below a predetermined temperature or temperature range;
   (3) when said sensed temperature is not below the predetermined temperature or temperature range, repeating steps (1) and (2);
   (4) when said sensed temperature is below the predetermined temperature or temperature range, determining how much methanol fuel has previously been delivered to said system for the purpose of raising the temperature of said system; and
   (5) when the amount of fuel previously delivered to said system for the purpose of raising the temperature of the system is less than a predetermined maximum limit, releasing fuel in such a manner as to cause or increase oxidation of such fuel, thereby generating heat and raising the temperature of the system, and fuel is released to an anode of said system to promote fuel cross-over through a membrane electrolyte, thereby causing or increasing oxidation of some of said cross-over fuel at a cathode and increasing the temperature of said system.

16. A method of controlling temperature in a direct methanol fuel cell system, said method comprising the steps of:
   (1) sensing a temperature in said system;
   (2) determining whether the sensed temperature is below a predetermined temperature or temperature range;
   (3) when said sensed temperature is not below the predetermined temperature or temperature range, repeating steps (1) and (2);
   (4) when said sensed temperature is below the predetermined temperature or temperature range, determining how much methanol fuel has previously been delivered to said system for the purpose of raising the temperature of said system; and
   (5) when the amount of fuel previously delivered to said system for the purpose of raising the temperature of the system is less than a predetermined maximum limit, releasing fuel in such a manner as to cause or increase oxidation of such fuel, thereby generating heat and raising the temperature of the system, and fuel is directly applied to a cathode of said system, thereby causing or increasing oxidation of fuel at said cathode and increasing the temperature of said system.

17. A method of controlling temperature in a direct oxidation fuel cell system, said method comprising the steps of:
   (1) providing a fuel source for delivering a carbonaceous fuel suitable for generating electricity in an electrochemical reaction to a fuel cell in said fuel cell system;
   (2) sensing an electrical parameter in said system, including either current or voltage, which has a predetermined relationship to said fuel cell system's temperature;
   (3) determining whether said fuel cell system's temperature is below a predetermined temperature range;
   (4) when said temperature is not below said predetermined range repeating steps (2) and (3); and
   (5) when said temperature is below said predetermined range increasing the amount of said carbonaceous fuel suitable for generating electricity in an electrochemical reaction introduced from the fuel source to said fuel cell of the system.

18. The method of controlling temperature in a direct oxidation fuel cell system as defined in claim 17, wherein said carbonaceous fuel suitable for generating electricity in an electrochemical reaction in a fuel cell in said fuel cell system is delivered from said fuel source to a cathode aspect of a membrane electrode assembly in said fuel cell of said fuel cell system.

19. The method of controlling temperature in a direct oxidation fuel cell system as defined in claim 17, wherein said carbonaceous fuel suitable for generating electricity in an electrochemical reaction in a fuel cell in said fuel cell system is delivered from said fuel source to an anode aspect of a membrane electrode assembly in said fuel cell of said cell system.

* * * * *